US010782539B2

(12) United States Patent
Chen

(10) Patent No.: US 10,782,539 B2
(45) Date of Patent: Sep. 22, 2020

(54) EYEGLASSES STRUCTURE

(71) Applicant: ASWAN INTERNATIONAL CORP., Taipei (TW)

(72) Inventor: Chiang-Mao Chen, Taipei (TW)

(73) Assignee: ASWAN INTERNATIONAL CORP., Taipei (TW)

( * ) Notice: Subject to any disclaimer, the term of this patent is extended or adjusted under 35 U.S.C. 154(b) by 142 days.

(21) Appl. No.: 16/002,967

(22) Filed: Jun. 7, 2018

(65) Prior Publication Data
US 2019/0377194 A1 Dec. 12, 2019

(51) Int. Cl.
*G02C 5/12* (2006.01)

(52) U.S. Cl.
CPC .................. *G02C 5/122* (2013.01)

(58) Field of Classification Search
CPC .......... G02C 5/122; G02C 5/12; G02C 5/126; G02C 5/124; G02C 5/128; G02C 2200/08; G02C 2200/16; G02C 5/006; G02C 2200/18; G02C 3/003; G02C 5/008; G02C 5/02; G02C 5/2263; G02C 5/06; G02C 5/08; G02C 5/20; G02C 11/10; G02C 1/08; G02C 2200/20; G02C 9/02; G02C 11/08; G02C 1/02; G02C 2200/12; G02C 2200/26; G02C 5/00; G02C 5/04; G02C 5/143; G02C 5/146; G02C 7/088; G02C 11/00; G02C 11/04; G02C 13/001; G02C 1/00; G02C 1/023; G02C 1/04; G02C 1/06; G02C 1/10; G02C 2200/02; G02C 2200/04; G02C 2200/14; G02C 2200/28; G02C 3/00; G02C 3/006; G02C 3/04; G02C 5/10; G02C 5/18; G02C 5/22; G02C 5/2209; G02C 5/2236; G02C 7/02; G02C 7/021; G02C 7/024; G02C 7/027; G02C 7/081; G02C 7/086; G02C 7/10; G02C 7/101; G02C 9/00
USPC ......................................................... 351/137
See application file for complete search history.

(56) References Cited

U.S. PATENT DOCUMENTS

| | | | | |
|---|---|---|---|---|
| 2007/0008482 A1* | 1/2007 | Teng | .................. | G02C 1/04 351/41 |
| 2008/0165318 A1* | 7/2008 | Oskarsson | ................ | G02C 3/00 351/71 |
| 2008/0198323 A1* | 8/2008 | Siu | ............................ | G02O 1/02 351/110 |
| 2016/0174706 A1* | 6/2016 | Volin | ..................... | A47B 85/04 297/119 |

* cited by examiner

*Primary Examiner* — Collin X Beatty
*Assistant Examiner* — Grant A Gagnon
(74) *Attorney, Agent, or Firm* — Li & Cai Intellectual Property (USA) Office

(57) ABSTRACT

An eyeglasses structure includes a frame body, at least one lens, a first elastic contacting member and a second elastic contacting member. The frame body includes an attaching portion and a positioning portion. The at least one lens is detachably attached to the attaching portion. Each of the first and second elastic contacting members includes an engaging portion detachably engages the positioning portion, a linking rod portion connected with the matching portion, and a nose pad portion connected to the linking rod portion. The radial cross-sectional area of the linking rod portion is smaller than that of the nose pad portion connected to the linking rod portion, so as to increase the swing angle of the nose pad portion relative to the engaging portion connected with the linking rod portion.

12 Claims, 10 Drawing Sheets

EYEGLASSES STRUCTURE

FIELD OF THE PRESENT DISCLOSURE

The present disclosure relates to an eyeglasses structure, and more particularly to an eyeglasses structure which automatically deforms to adjust itself to the nose bridge curve of a wearer.

BACKGROUND OF THE PRESENT DISCLOSURE

In general, eyeglasses are designed with a pair of lens frames where lens are inserted and placed, and a pair of temples is provided on the outer side of the frames. In order to maintain the eyeglasses in a predetermined position on a wearer's face, nose pad arms are usually provided on the inner side of the frames to connect the nose pads, so that the eyeglasses can be worn on the sides of the nose bridge of the wearer with the aid of the nose pads, thereby avoiding the eyeglasses from falling and achieving satisfactory wearing effects. A conventional nose pad arm design generally involves folding a metal rod into an inverted U shape, with one end fixedly attached to an eyeglasses frame, and the other end connected with a nose pad. The distance between the frame and the eyes is thus maintained by the support of the nose pad arms.

However, since a nose pad arm is formed by folding a metal rod, which is for supporting and maintaining, first, the wearing relation between the eyeglasses and the wearer's nose bridge, and second, the contacting relation between the nose pads and the wearer's nose bridge, and since each person's nose bridge curve is different from each other, when the eyeglasses are worn for the first time, usually a satisfactory fitting relation can only be attained after multiple adjustments, which is rather troublesome and time-consuming. Further, after the eyeglasses have been worn for a period of time, the nose pads often are deformed due to external force or other factors, making them unable to abut against and suit a wearer's nose bridge properly, which in turn results in the eyeglasses sliding on the wearer's face, being tilted or out of focus. Therefore, a wearer often has to head back to an optician for nose pad adjustment, which is also troublesome and inconvenient. Also, after multiple adjustments, nose pad arms are prone to damages or even fractures, resulting in the loss of the wearability of the eyeglasses, and necessitating the replacement of nose pad arms or frames, or even the entire set of the eyeglasses.

In addition, because of the inelasticity of the nose pad arms and the nose pads, as the latter are made of hard colloid, when used for a long time, nose pads press deep indentation on the nose bridge skin, and therefore makes the wearer uncomfortable. Also, when the eyeglasses are hit by an external force, the nose pad arms and the nose pads directly transmit the external force borne by such to the wearer's nose bridge, which can easily cause a direct damage to the wearer's nose bridge.

SUMMARY OF THE PRESENT DISCLOSURE

In response to the above-referenced technical inadequacies, the present disclosure provides an eyeglasses structure which automatically deforms to adjust itself to the nose bridge curve of a wearer.

In certain aspects, the present disclosure provides an eyeglasses structure, which includes a frame body, at least one lens, a first elastic contacting member and a second elastic contacting member. The frame body has an attaching portion and a positioning portion. The at least one lens is detachably attached to the attaching portion. The first elastic contacting member includes a first engaging portion for detachably engaging the positioning portion, a first linking rod portion connected to the first engaging portion, and a first pad portion connected to the first linking rod portion. The second elastic contacting member includes a second engaging portion for detachably engaging the positioning portion, a second linking rod portion connected to the second engaging portion and a second pad portion connected to the second linking rod portion. The radial cross-sectional area of the first linking rod portion is smaller than a radial cross-sectional area of the first pad portion, so as to increase a swing angle of the first pad portion relative to the first engaging portion. The radial cross-sectional area of the second linking rod portion is smaller than a radial cross-sectional area of the second pad portion, so as to increase a swing angle of the second pad portion relative to the second engaging portion.

One of the beneficial effects of the present disclosure is that, through the technical features of "the first elastic contacting member includes a first engaging portion detachably fitted to and engaged with the positioning portion, a first linking rod portion connected to the first engaging portion, and a first pad portion connected to the first linking rod portion," "the second elastic contacting member includes a second engaging portion detachably fitted to and engaged with the positioning portion, a second linking rod portion connected to the second engaging portion, and a second pad portion connected to the second linking rod portion," "the radial cross-sectional area of the first linking rod portion is smaller than the radial cross-sectional area of the first pad portion, so as to increase the swing angle of the first pad portion relative to the first engaging portion," and "the radial cross-sectional area of the second linking rod portion is smaller than the radial cross-sectional area of the second pad portion, so as to increase the swing angle of the second pad portion relative to the second engaging portion," the present disclosure enables the first pad portion and the second pad portion to automatically perform angle adjustment according to a wearer's nose bridge curve, so as to achieve a good contacting relation between the nose bridge and the first pad portion and the second pad portion, reduce the pressure exerted on the nose bridge, resolve the adjustment problem arisen from the high deformability of a conventional eyeglasses nose bridge pad, and significantly increase the comfort and stability when the eyeglasses are worn on a user's nose.

These and other aspects of the present disclosure will become apparent from the following description of the embodiment taken in conjunction with the following drawings and their captions, although variations and modifications therein can be affected without departing from the spirit and scope of the novel concepts of the present disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
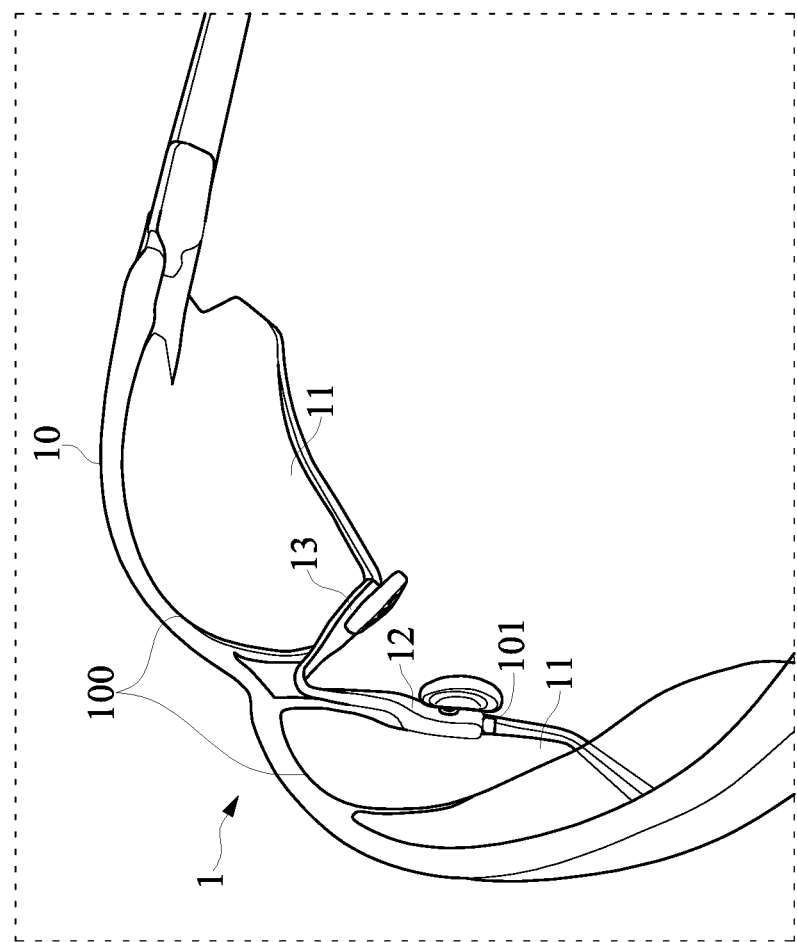
FIG. 1 is a perspective view of an eyeglasses structure according to a first embodiment of the present disclosure.
Figure 2:
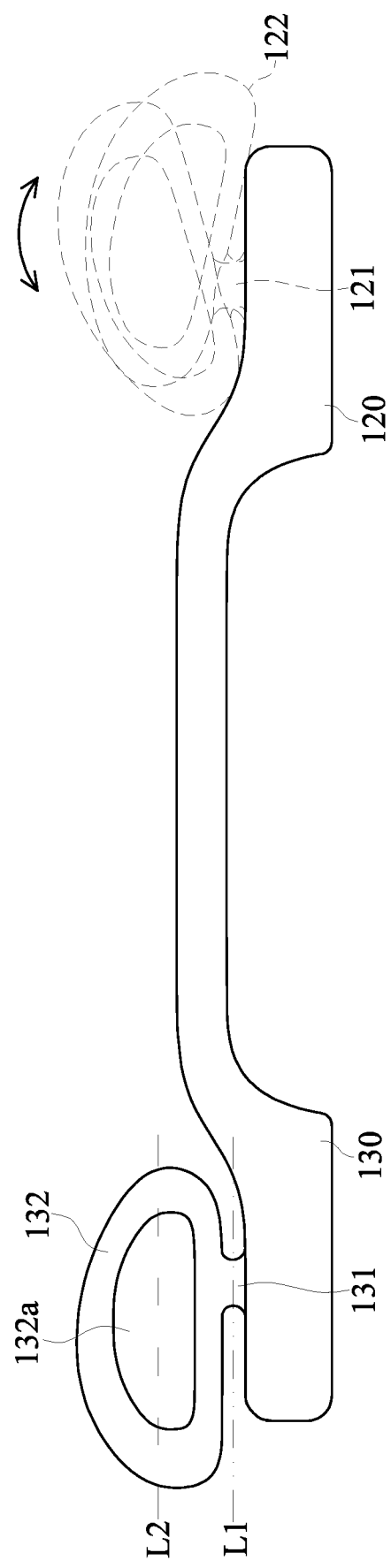
FIG. 2 is a top view of an elastic contacting member according to the first embodiment of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles can be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be expressed in more than one way. Consequently, alternative language and synonyms can be used for any one or more of the terms discussed herein, and no special significance is to be placed upon whether or not a term is elaborated or discussed herein. Synonyms for certain terms can be provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including any definitions given herein, will prevail.

While numbering terms such as "first", "second" or "third" can be used in this disclosure to describe various components, signals or the like, the terms are for distinguishing one component from another component, or one signal from another signal only, and are not intended to, nor should they be construed to impose any other substantive descriptive limitations on the components, signals or the like.

First Embodiment

Reference is made to FIG. 1 to FIG. 4, which are respectively a perspective view of the eyeglasses structure, a top view and a side view of an elastic contacting member, and a cross-sectional view of a linking rod portion and a pad portion according to a first embodiment of the present disclosure. As shown in the above-referenced figures, the first embodiment of the present disclosure provides an eyeglasses structure 1, which includes a frame body 10, at least one lens 11, a first elastic contacting member 12 and a second elastic contacting member 13. The frame body 10 has an attaching portion 100 and a positioning portion 101. The at least one lens 11 is detachably disposed on and attached to the attaching portion 100. The first elastic contacting member 12 includes a first engaging portion 120 detachably fitted to and engaged with the positioning portion 101, a first linking rod portion 121 connected to the first engaging portion 120, and a first pad portion 122 connected to the first linking rod portion 121. The second elastic contacting 13 includes a second engaging portion 130 detachably fitted to and engaged with the positioning portion 101, a second linking rod portion 131 connected to the second engaging portion 130, and a second pad portion 132 connected to the second linking rod portion 131. The radial cross-sectional area of the first linking rod portion 121 is smaller than the radial cross-sectional area of the first pad portion 122, which increases the swing angle of the first pad portion 122 relative to the first engaging portion 120. The radial cross-sectional area of the second linking rod portion 131 is smaller than the radial cross-sectional area of the second pad portion 132, which increases the swing angle of the second pad portion 132 relative to the second engaging portion 130.

Specifically, the eyeglasses structure 1 of the present disclosure includes the frame body 10, at least one lens 11, the first elastic contacting portion 12 and the second elastic contacting portion 13. The frame body 10 can be made of metal or plastic material. The frame body 10 has the attaching portion 100 for attaching the at least one lens 11, and the positioning portion 101 for engaging the first elastic contacting portion 12 and the second elastic contacting portion 13. In certain embodiments, the at least one lens 11 includes a plurality of lenses attached to or engaged with the attaching portion 100. The first elastic contacting portion 12 includes the first engaging portion 120, the first linking rod portion 121, and the first pad portion 122. The first engaging portion 120 is detachably fitted to and engaged with the positioning portion 101. One end of the first linking rod portion 121 is connected to the first engaging portion 120, and the other end of the first linking rod portion 121 is connected to the first pad portion 122. The radial cross-sectional area of the first linking rod portion 121 is smaller than the radial cross-sectional area of the first pad portion 122. The second elastic contacting portion 13 includes the second engaging portion 130, the second linking rod portion 131, and the second pad portion 132. The second engaging portion 130 is detachably fitted to and engaged with the positioning portion 101. One end of the second linking rod portion 131 is connected to the second engaging portion 130, and the other end of the second linking rod portion 131 is connected to the second pad portion 132. The radial cross-sectional area of the second linking rod portion 131 is smaller than the radial cross-sectional area of the second pad portion 132. In certain embodiments, at least one of the first elastic contacting member 12 and the second elastic contacting member 13 is made of thermoplastic elastomers, such as polybutadiene (butadiene rubber, BR), polyisoprene (isoprene rubber, IR), natural rubber (NR), ethylene propylene diene monomer (EPDM) rubber, butyl rubber (isobutylene isoprene rubber, IIR), polyisobutylene, polyethylene-polybutylene, amorphous polyethylene, polyether, polyester, and the like.

Therefore, when a user wears the eyeglasses structure 1 of the present disclosure, through the elastic property of the first elastic contacting member 12 and the second elastic contacting member 13, the first pad portion 122 and the second pad portion 132 automatically perform angle adjustment according to the wearer's nose bridge curve, leading to a good contacting relation between the nose bridge and the first pad portion 122 and the second pad portion 132. Also, when the first linking rod portion 121 and the second linking rod portion 131 of the eyeglasses structure 1 are deformed by external force or other factors, resulting in the first pad portion 122 and the second pad portion 132 not suiting the wearer's nose bridge properly, the wearer needs only to remove the eyeglasses structure 1 from his or her nose bridge and then wear it again, as the first pad portion 122 and the second pad portion 132 can again automatically perform angle adjustment according to the wearer's nose bridge curve, leading to a good contacting relation between his or her nose bridge and the first pad portion 122 and the second pad portion 132.

Figure 4:
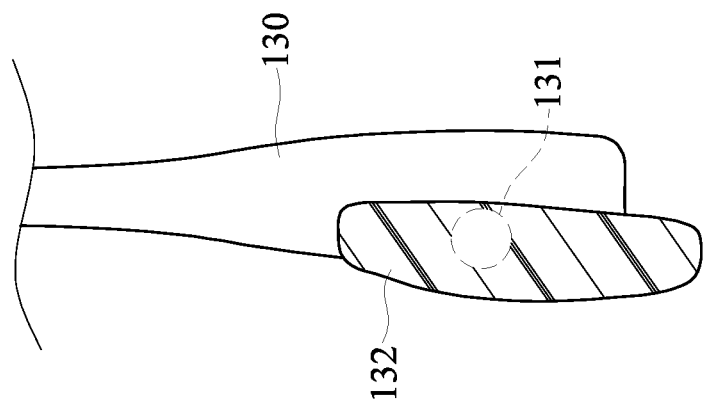
FIG. 4 is a cross-sectional view of a linking rod portion and a pad portion of the first embodiment of the present disclosure.
Figure 3:
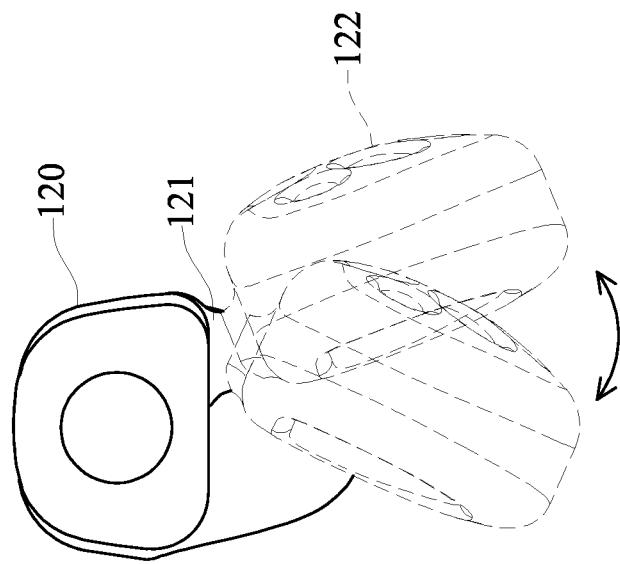
FIG. 3 is a side view of an elastic contacting member according to the first embodiment of the present disclosure.

Further, when the first linking rod portion 121 and the second linking rod portion 131 of the eyeglasses structure 1 are pressed by external force or other factors, the first linking rod portion 121 and the second linking rod portion 131 are bent or deformed. Since the radial cross-sectional area of the first linking rod portion 121 is smaller than the radial cross-sectional area of the first pad portion 122, the swing angle of the first pad portion 122 relative to the first engaging portion 120 is increased. Also, as shown in FIG. 4, which is a cross-sectional view of the second elastic contacting member 13 overlapping the radial cross-sectional lines L1 and L2 in FIG. 2, since the radial cross-sectional area of the second linking rod portion 131 is smaller than the radial cross-sectional area of the second pad portion 132, the swing angle of the second pad portion 132 relative to the second engaging portion 130 is increased. Therefore, through the above structural design, a bearable deformation degree of each of the first linking rod portion 121 and the second linking rod portion 131 is increased, so that the first linking rod portion 121 and the second linking rod portion 131 are not damaged or broken after a series of bending and deforming. Also, when the eyeglasses structure 1 is hit by an external force, the first linking rod portion 121 and the second linking rod portion 131 can bend or deform with the aid of their high tolerable deformation capacity, instead of directly transmitting the external force borne by such to the wearer's nose bridge, thus avoiding damage to the wearer's nose bridge.

Thereby, through the above-referenced structural design, the eyeglasses structure 1 of the present disclosure enables the first pad portion 122 and the second pad portion 132 to automatically perform angle adjustment according to the wearer's nose bridge curve in a rotating movement similar to that of a universal bearing, so as to achieve a good contacting relation between the nose bridge and the first pad portion 122 and the second pad portion 132, reduce the pressure exerted on the nose bridge, resolve the adjustment problem arisen from the high deformability of a conventional eyeglasses nose pad, and significantly increase the comfort and stability when the eyeglasses are worn on a user's nose.

In certain embodiments, the first engaging portion 120 and the second engaging portion 130 are connected to each other and form a single member. And the single member is in an inversed V shape or an inversed U shape. That is, the first elastic contacting member 12 and the second elastic contacting member 13 of the eyeglasses structure 1 of the present disclosure can be an integrally formed single member, and can be in an inversed V shape or an inversed U shape. Therefore, through the afore-referenced structural design, when performing angle adjustment, the first pad portion 122 and the second pad portion 132 can also have linking movement through the mutual connection between the first engaging portion 120 and the second engaging portion 130, thereby increasing the comfort and stability when the eyeglasses are worn on a user's nose.

In certain embodiments, each of the first elastic contacting member 12 and the second elastic contacting member 13 can be a single and independent member that is different from or the same as the other one. And the first elastic contacting member 12 and the second elastic contacting member 13 can be detachably engaged with each other through, for example, thread locking. However, the present disclosure is not limited thereto.

Referring again to FIG. 2 and FIG. 3, in certain embodiments, the first linking rod portion 121 enables the first pad portion 122 to movably swing within a first predetermined range through the flexibility and elasticity of the first linking rod portion 121. The second linking rod portion 131 enables the second pad portion 132 to movably swing within a second predetermined range through the flexibility and elasticity of the second linking rod portion 131. Each of the first predetermined range and the second predetermined range covers a space in a shape of half a sphere or three fourths (¾) of a sphere. Further, through the structural design of the radial cross-sectional area of the first linking rod portion 121 being smaller than the radial cross-sectional area of the first pad portion 122, the swing angle of the first pad portion 122 relative to the first engaging portion 120 is increased. Through the structural design of the radial cross-sectional area of the second linking rod portion 131 being smaller than the radial cross-sectional area of the second pad portion 132, the swing angle of the second pad portion 132 relative to the second engaging portion 130 is increased. Therefore, through the elasticity of the first linking rod portion 121, the first pad portion 122 can movably swing within a first predetermined range, for example, a swinging range covering a space in a shape of half a sphere or three fourths (¾) of a sphere. Further, through the elasticity of the second linking rod portion 131, the second pad portion 132 can movably swing within a second predetermined range, for example, a swinging range covering a space in a shape of half a sphere or three fourths (¾) of a sphere.

It is further noted that the eyeglasses structure 1 of the present disclosure is not limited by the above-referenced examples.

Second Embodiment

Figure 5:
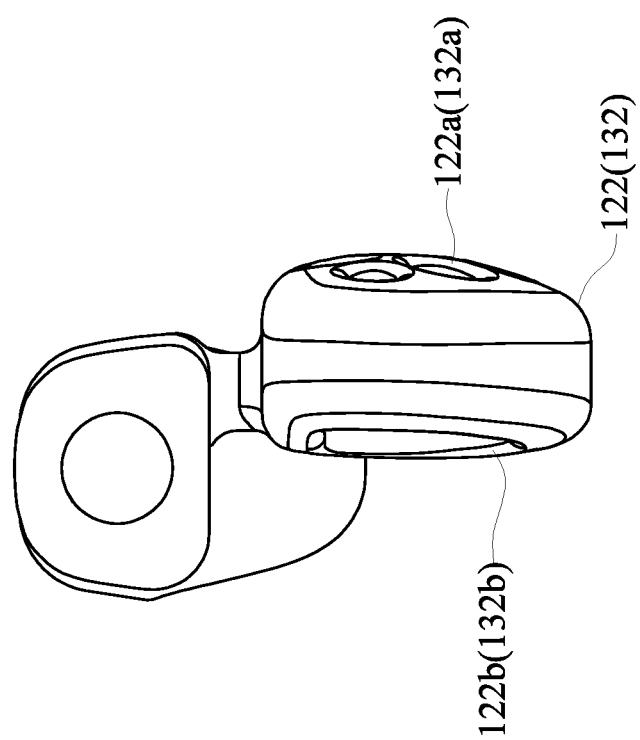
FIG. 5 is a side view of an eyeglasses structure according to a second embodiment of the present disclosure.
Figure 6:
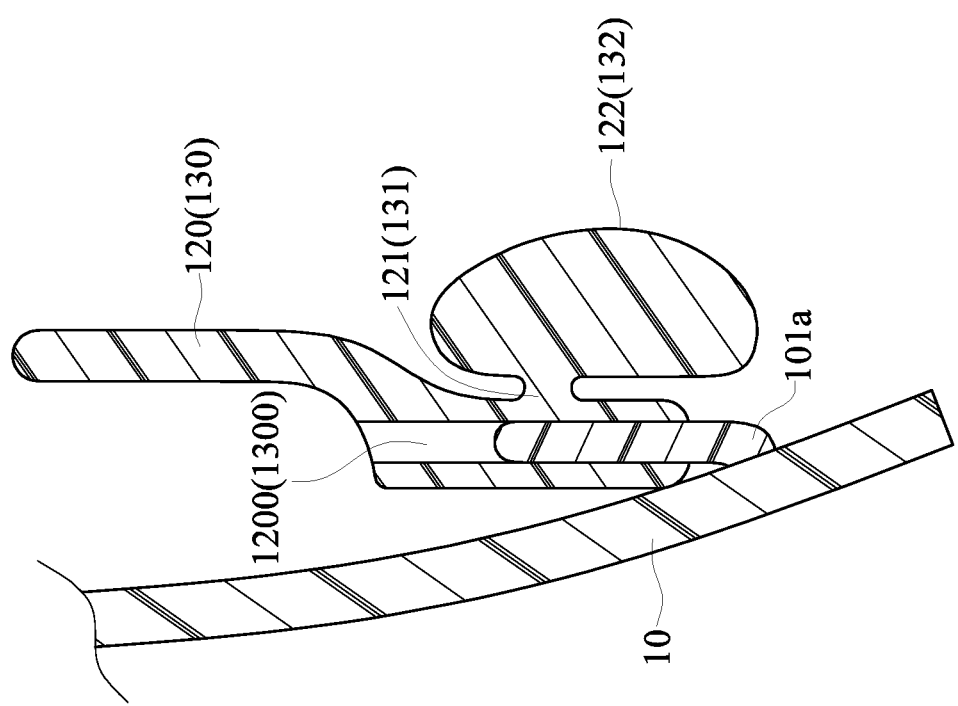
FIG. 6 is a side cross-sectional view of the eyeglasses structure according to the second embodiment of the present disclosure.

Reference is made to FIG. 5 and FIG. 6, which are respectively a side view and a side cross-sectional view of an eyeglasses structure according to a second embodiment of the present disclosure. Reference is also made to FIG. 1 to FIG. 4. As shown in the above-referenced figures, the operation of certain elements of the eyeglasses structure in the present embodiment is similar to their counterparts of the eyeglasses structure in the first embodiment, which is therefore not described in detail herein. It should be noted that in this embodiment, the first engaging portion 120 has a first through hole 1200, and the second engaging portion 130 has a second through hole 1300. The positioning portion 101 includes a plurality of fixing pillars 101a. The first engaging portion 120 is detachably fitted to and engaged with one of the fixing pillars 101a through the first through hole 1200, and the second engaging portion 130 is detachably fitted to and engaged with another one of the fixing pillars 101a through the second through hole 1300.

For example, the body of the first engaging portion 120 of the present disclosure further has the first through hole 1200, the body of the second engaging portion 130 of the present disclosure further has the second through hole 1300. The positioning portion 101 includes a plurality of fixing pillars 101a. Therefore, through the detachable engagement between one of the fixing pillars 101a and the first through hole 1200, and the detachable engagement between another one of the fixing pillars 101a and the second through hole 1300, the first engaging portion 120 and the second engaging portion 130 are engaged with the positioning portion 101 of the frame body 10.

It is worth noting that at least one of the inner wall of the first through hole 1200 of the first engaging portion 120 and the inner wall of the second through hole 1300 of the second engaging portion 130 is provided with at least one buckling structure (not shown in the figure), such as a protruding dot or a protruding rim, so that the first engaging portion 120 and the second engaging portion 130 can be firmly engaged with the positioning portion 101.

In certain embodiments, one side of the first pad portion 122 is provided with at least one protrusion portion 122a, and another side of the first pad portion 122 is provided with at least one recession portion 122b. One side of the second pad portion 132 is provided with at least one protrusion portion 132a, and another side of the second pad portion 132 is provided with at least one recession portion 132b. That is, by forming at least one protrusion portion 122a on the first pad portion 122 and at least one protrusion portion 132a on the second pad portion 132, the contacting force between the first pad portion 122 and the second pad portion 132 and a wearer's nose bridge can be increased, and the slipping of the eyeglasses structure 1 on the wearer's nose bridge, as can result from shaking, can be greatly avoided. Further, by forming at least one recession portion 122b on the first pad portion 122 and at least one recession portion 132b on the second pad portion 132, the manufacturing costs can be reduced, and the supportability of the first pad portion 122 and the second pad portion 132 can be increased.

Third Embodiment

Figure 7:
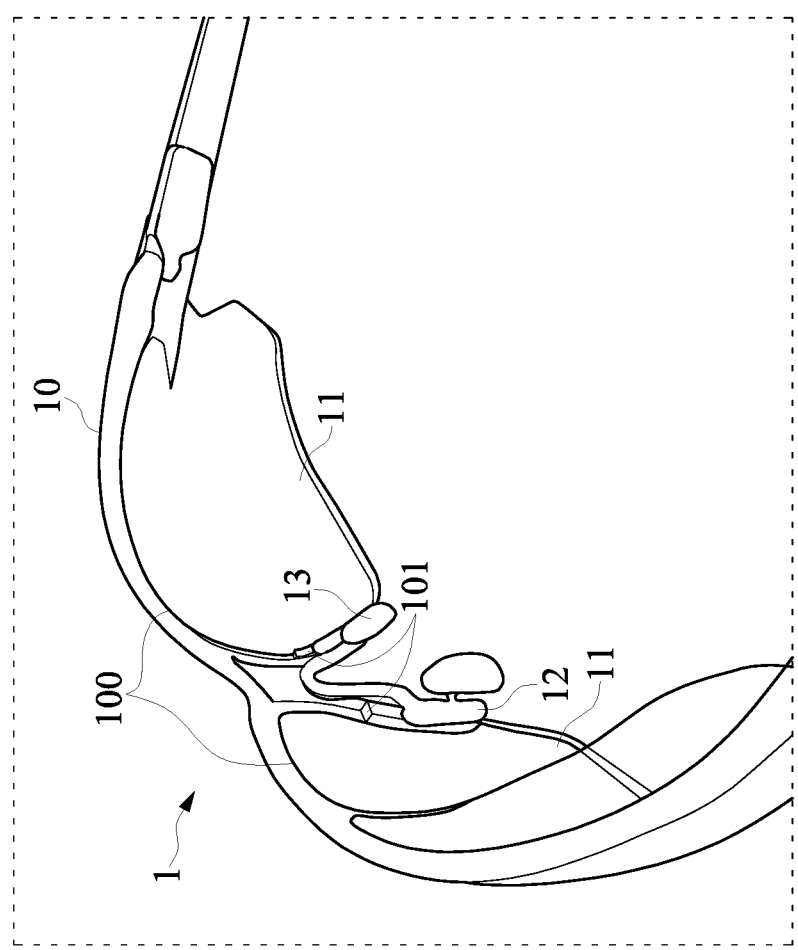
FIG. 7 is a first perspective view of an eyeglasses structure according to a third embodiment of the present disclosure.
Figure 8:
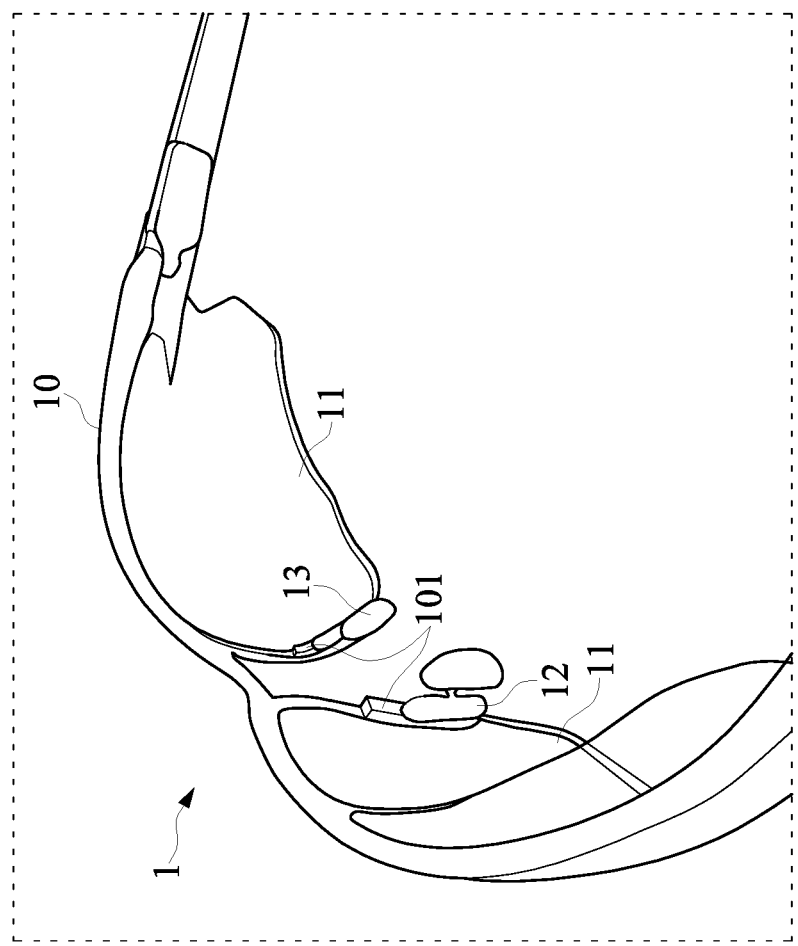
FIG. 8 is a second perspective view of an eyeglasses structure according to the third embodiment of the present disclosure.

Reference is made to FIG. 7 and FIG. 8, which are respectively a first perspective view and a second perspective view of the eyeglasses structure of a third embodiment of the present disclosure. Reference is also made to FIG. 1 to FIG. 6. As shown in the above-referenced figures, the operation of certain elements of the eyeglasses structure in the present embodiment is similar to their counterparts of the eyeglasses structures in the above-referenced embodiments, which is therefore not described in detail herein. It should be noted that in this embodiment, the first elastic contacting member 12 is separated from and independent of the second elastic contacting member 13, while the contour of the first elastic contacting member 12 can be the same as or different from the second elastic contacting member 13. In certain embodiments, the first elastic contacting member 12 is an exact replica of the second elastic contacting member 13. That is, each of the first elastic contacting member 12 and the second elastic contacting member 13 of the eyeglasses structure 1 of the present disclosure is an independent single element, and independently engages with the positioning portion 101. In certain embodiments, the structure of the first elastic contacting member 12 can be the same as or different from the second elastic contacting member 13. Therefore, through the above-referenced structural design, the eyeglasses structure 1 of the present disclosure allows a user to independently replace one of the first elastic contacting member 12 and the second elastic contacting member 13 without needing to replace both of such at the same time.

In certain embodiments, the first engaging portion 120 and the second engaging portion 130 can be connected to each other to be a single element. The single element formed is in a shape of inversed V or inversed U. That is, the first engaging portion 120 and the second engaging portion 130 of the eyeglasses structure 1 of the present disclosure can be an integrally formed single element in an inversed V shape or inversed U shape. Therefore, through the above-referenced structural design, when the eyeglasses structure 1 of the present disclosure performs angle adjustment, the first pad portion 122 and the second pad portion 132 can also have linking movement through the mutual connection between the first engaging portion 120 and the second engaging portion 130, thereby increasing the comfort and stability when the eyeglasses are worn on a user's nose.

Fourth Embodiment

Figure 9:
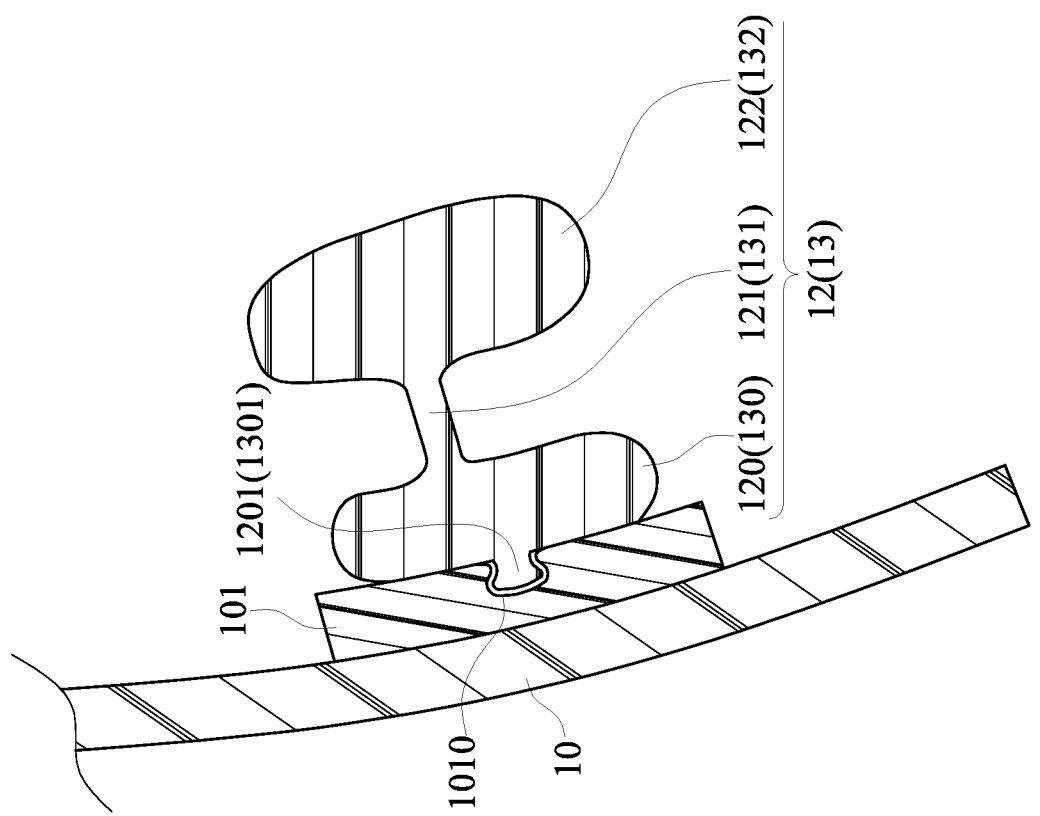
FIG. 9 is a side cross-sectional view of an eyeglasses structure according to a fourth embodiment of the present disclosure.

Reference is made to FIG. 9, which is a side cross-sectional view of an eyeglasses structure according to a fourth embodiment of the present disclosure. Reference is also made to FIG. 1 to FIG. 8. As shown in the above-referenced figures, the operation of certain elements of the eyeglasses structure in the present embodiment is similar to their counterparts of the eyeglasses structures in the above-referenced embodiments, which is therefore not described in detail herein. It should be noted that in the present embodiment, the positioning portion 101 includes a plurality of fixing slots 1010. Each of the fixing slots 1010 has an opening and a closed bottom opposite to the opening. The opening is formed on a surface of the positioning portion 101 facing the first elastic contacting member 12 or the second elastic contacting member 13. The first engaging portion 120 has at least one first protruding portion 1201.

The first protruding portion 1201 is formed on and protruding away from the surface of the first engaging portion 120. The first engaging portion 120 is detachably fitted to and engaged with a corresponding fixing slot 1010 through at least one first protruding portion 1201. The second engaging portion 130 has at least one second protruding portion 1301. The second protruding portion 1301 is formed on and protruding away from the surface of the second engaging portion 130. The second engaging portion 130 is detachably fitted to and engaged with a corresponding fixing slot 1010 through at least one second protruding portion 1301. In certain embodiments, each fixing slot 1010 is in the shape of a droplet, and each of the first protruding portion 1201 and the second protruding portion 1301 is in the shape of a mushroom.

In certain embodiments, as shown in FIG. 9, the droplet shape of the fixing slot 1011 is defined as the fixing slot 1011 having a body portion and a neck portion, and the minimal width of the projection of the neck portion on a plane substantially parallel to an axis of the fixing slot 1011 being smaller than the maximal width of the projection of the body portion on the plane and smaller than the width of the projection of the opening of the fixing slot 1011 on the plane. The axis of the fixing slot 1011 is defined by a point on a cross-section of the body portion having the maximal area among the cross-sections of the body portion (defined as the maximum cross-section of the body portion), and a point on a cross-section of the neck portion having the minimal area among the cross-sections of the neck portion (defined as the minimum cross-section of the neck portion), and both of which are substantially parallel to a plane with which the opening of the fixing slot 1011 is coplanar. One end of the neck portion defines and forms the opening of the fixing slot 1011, and the other end of the neck portion forms another opening connected to and communicating with the body portion. One end of the body portion is connected to and communicates with the other end of the neck portion, and the other end of the body portion forms the closed bottom of the fixing slot 1011. In certain embodiments, the axis of the fixing slot 1011 is defined by a center of the maximum cross-section of the body portion and a center of the minimum cross-section of the neck portion, and the minimal width of the projection of the neck portion on a plane where the axis of the fixing slot 1011 is located is smaller than the maximal width of the projection of the body portion on the plane and smaller than the width of the projection of the opening of the fixing slot 1011 on the plane.

In certain embodiments, as shown in FIG. 9, the mushroom shape of at least one of the first protruding portion 1201 and the second protruding portion 1301 is defined as at least one of the first protruding portion 1201 and the second protruding portion 1301 having a head portion and a neck portion, and the minimal width of the projection of the neck portion on a plane substantially parallel to an axis of a corresponding first protruding portion 1201 or a corresponding second protruding portion 1301 being smaller than the maximal width of the projection of the head portion on the plane. The axis of the corresponding first protruding portion 1201 or the corresponding second protruding portion 1301 is defined by a point on a cross-section of the head portion having the maximal area among the cross-sections of the head portion (defined as the maximum cross-section of the head portion) and a point on a cross-section of the neck portion having the minimal area among the cross-sections of the neck portion (defined as the minimum cross-section of the neck portion), and both of such are substantially parallel to the surface of the corresponding first engaging portion 120 or the corresponding second engaging portion 130 from which the corresponding first protruding portion 1201 or the corresponding second protruding portion 1301 is protruding. One end of the neck portion is connected to the head portion, and the other end of the neck portion is connected to the surface of the corresponding first engaging portion 120 or the second engaging portion 130 from which the first protruding portion 1201 or the second protruding portion 1301 is protruding. In certain embodiments, the axis of at least one of the first protruding portion 1201 and the second protruding portion 1301 is defined by a center of the maximum cross-section of the head portion and a center of a minimum cross-section of the neck portion, and the minimal width of the projection of the neck portion on a plane where the axis of the at least one of the first protruding portion 1201 and the second protruding portion 1301 is located is smaller than the maximal width of the projection of the head portion on the plane. In certain embodiments, the minimal width of the neck portion is smaller than a width of the surface the neck portion is protruding from. However, the present disclosure is not limited thereto.

For example, the positioning portion 101 of the eyeglasses structure 1 of the present disclosure includes a plurality of fixing slots 1010. The first engaging portion 120 correspondingly has at least one first protruding portion 1201. The second engaging portion 130 correspondingly has at least one second protruding portion 1301. It is noted that in the present embodiment, the number of each of the first protruding portion 1201 and the second protruding portion 1301 being one is for illustrative purpose only, and the present disclosure is not limited thereto. In practical usage, each of the number of the first protruding portion 1201 and the second protruding portion 1301 can be two or more than two. Therefore, when the eyeglasses structure 1 undergoes assembling, the first engaging portion 120 can be engaged with the corresponding fixing slot(s) 1010 in a snap-fit manner through at least one first protruding portion 1201, so as to be engaged with the positioning portion 101. Also, the second engaging portion 130 can be engaged with the corresponding fixing slot(s) 1010 in a snap-fit manner through at least one second protruding portion 1301, so as to be engaged with the positioning portion 101. In addition, the eyeglass structure 1 of the present disclosure can further have a design in which the fixing slot(s) 1010 is in a droplet shape, and at least one of the first protruding portion(s) 1201 and the second protruding portion(s) 1301 is in a mushroom shape, so that the first engaging portion 120 and the second engaging portion 130 can be firmly engaged with the positioning portion 101 without falling off therefrom easily.

In certain embodiments, the positioning portion 101 is made of elastic material. Therefore, even after a user removes the first engaging portion 120 or the second engaging portion 130 from the positioning portion 101, the first protruding portion 1201 and the second protruding portion 1301 retain their original shapes, so that the user can again fit the first engaging portion 120 or the second engaging portion 130 into the positioning portion 101 in the future.

It is further noted that the eyeglasses structure 1 of the present disclosure is not limited by the above-referenced examples.

Fifth Embodiment

Figure 10:
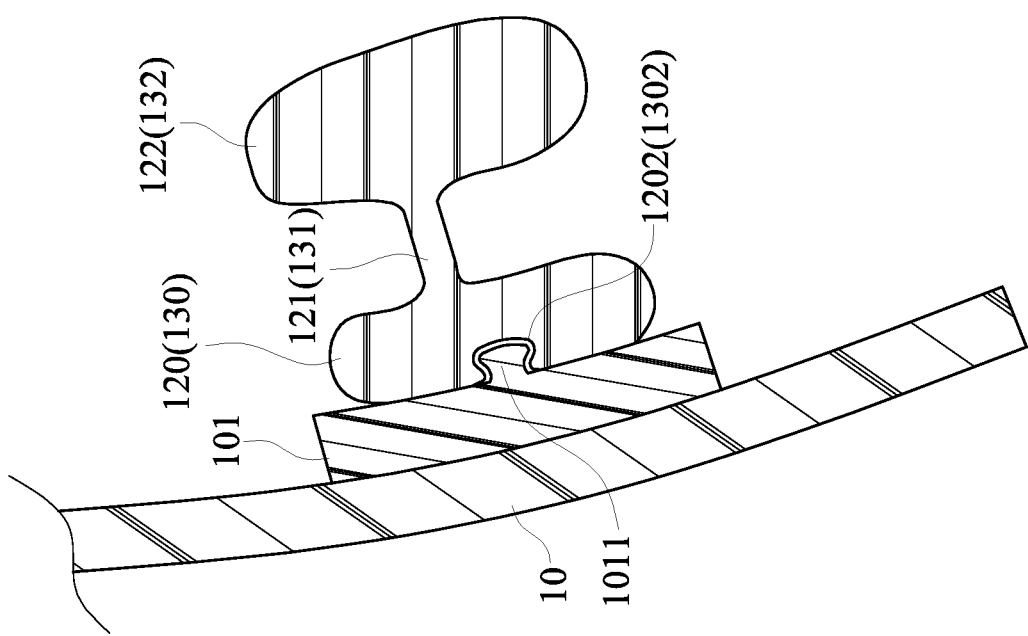
FIG. 10 is a side cross-sectional view of an eyeglasses structure according to a fifth embodiment of the present disclosure.

Reference is made to FIG. 10, which is a side cross-sectional view of an eyeglasses structure according to a fifth embodiment of the present disclosure. Reference is also made to FIG. 1 to FIG. 9. As shown in the above-referenced figures, the operation of certain elements of the eyeglasses structure in the present embodiment is similar to their counterparts of the eyeglasses structures in the above-referenced embodiments, which is therefore not described in detail herein. It should be noted that in the present embodiment, the positioning portion 101 includes a plurality of fixing portions 1011. The first engaging portion 120 has at least one first slot 1202. The first engaging portion 120 is detachably fitted to and engaged with a corresponding fixing portion 10121 through at least one first slot 1202. The second engaging portion 130 has at least one second slot 1302. The second engaging portion 130 is detachably fitted to and engaged with a corresponding fixing portion 1011 through at least one second slot 1302. In certain embodiments, each fixing portion 1011 is in the shape of a mushroom, and each of the first slot 1202 and the second slot 1302 is in the shape of a droplet.

Specifically, the positioning portion 101 of the eyeglasses structure 1 of the present disclosure includes a plurality of fixing portions 1010. The first engaging portion 120 correspondingly has at least one first slot 1202. The second engaging portion 130 correspondingly has at least one second slot 1302. It is noted that in the present embodiments, the number of each of the first slot 1202 and the second slot 1302 being one is for illustrative purpose only, and the present disclosure is not limited thereto. In practical usage, the number of each of the first slot 1202 and the second slot 1302 can be two or more than two. Therefore, when the eyeglasses structure 1 undergoes assembling, the first engaging portion 120 can be engaged with the corresponding fixing portion(s) 1011 in a snap-fit manner through at least one first slot 1202, so as to be engaged with the positioning portion 101. Also, the second engaging portion 130 can be engaged with the corresponding fixing portion(s) 1011 in a snap-fit manner through at least one second slot 1302, so as to be engaged with the positioning portion 101. In addition, the eyeglass structure 1 of the present disclosure can further have a design in which the fixing portion(s) 1011 is in a mushroom shape, and the first slot(s) 1202 and the second slot(s) 1302 are in a droplet shape, so that the first engaging portion 120 and the second engaging portion 130 can be firmly engaged with the positioning portion 101 without falling off therefrom easily.

In certain embodiments, the first engaging portion 120 and the second engaging portion 130 are made of elastic material. Therefore, even after a user removes the first engaging portion 120 or the second engaging portion 130 from the positioning portion 101, the fixing portion(s) 1011 retains its original shapes, so that a user can again fit the first engaging portion 120 or the second engaging portion 130 into the positioning portion 101 in the future.

It is further noted that the eyeglasses structure 1 of the present disclosure is not limited by the above-referenced examples.

Sixth Embodiment

Figure 11:
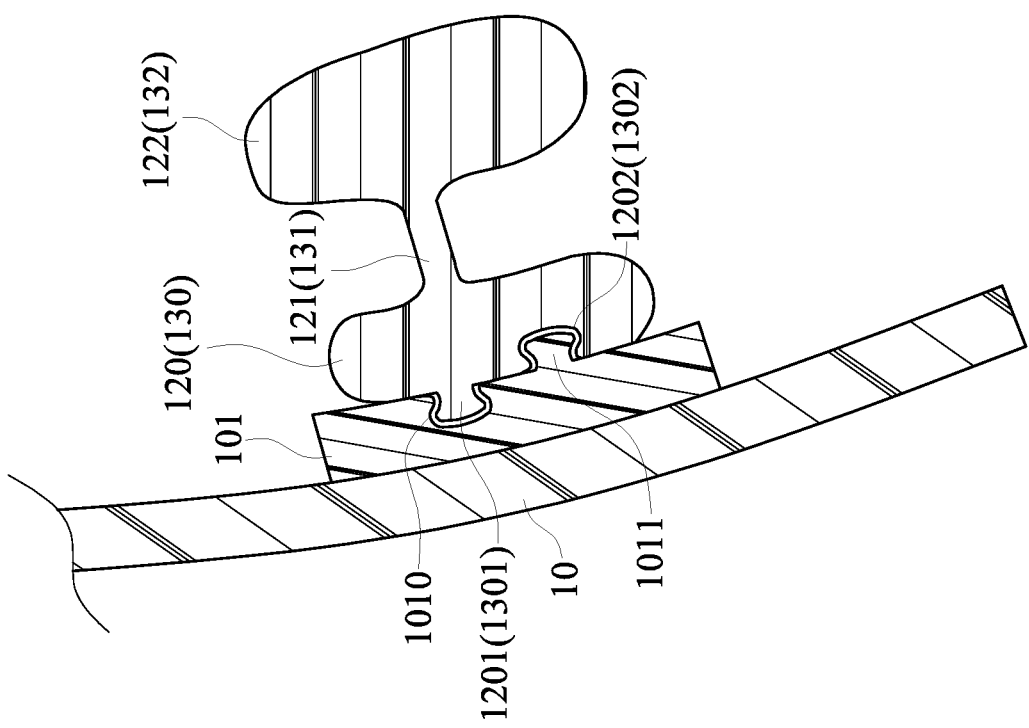
FIG. 11 is a side cross-sectional view of an eyeglasses structure according to a sixth embodiment of the present disclosure.

Reference is made to FIG. 11, which is a side cross-sectional view of an eyeglasses structure according to a sixth embodiment of the present disclosure.

Reference is also made to FIG. 1 to FIG. 10. As shown in the above-referenced figures, the operation of certain elements of the eyeglasses structure in the present embodiment is similar to their counterparts of the eyeglasses structures in the above-referenced embodiments, which is therefore not described in detail herein. It should be noted that in the present embodiment, the positioning portion 101 includes a plurality of fixing portions 1011 and a plurality of fixing slots 1012. The first engaging portion 120 has at least one first slot 1202 and at least one first protruding portion 1201. The first engaging portion 120 is detachably fitted to and engaged with a corresponding fixing portion 1011 through at least one first protruding slot 1202, and detachably fitted to and engaged with a corresponding fixing slot 1010 through at least one first protruding portion 1201. The second engaging portion 130 has at least one second slot 1302 and at least one second protruding portion 1301. The second engaging portion 130 is detachably fitted to and engaged with a corresponding fixing portion 1011 through at least one second slot 1302, and detachably fitted to and engaged with a corresponding fixing slot 1010 through at least one second protruding portion 1301. In certain embodiments, each fixing portion 1011, the first protruding portion 1201 and the second protruding portion 1301 is in the shape of a mushroom, and each of the fixing slot 1010, the first slot 1202 and the second slot 1302 is in the shape of a droplet.

For example, the positioning portion 101 of the eyeglasses structure 1 of the present disclosure includes a plurality of fixing slots 1010 and a plurality of fixing portions 1011. The first engaging portion 120 correspondingly has at least one first protruding portion 1201 and at least one first slot 1202. The second engaging portion 130 correspondingly has at least one second protruding portion 1301 and at least one second slot 1302. It is noted that in the present embodiments, the number of each of the first protruding portion 1201, the first slot 1202, the second protruding portion 1301 and the second slot 1302 being one is for illustrative purposely, and the present disclosure is not limited thereto. In practical usage, the number of the first protruding portion 1201, the first slot 1202, the second protruding portion 1301 or the second slot 1302 can be two or more than two. Therefore, when the eyeglasses structure 1 undergoes assembling, the first engaging portion 120 can be engaged with the corresponding fixing slot(s) 1010 in a snap-fit manner through at least one first protruding portion 1201, and be engaged with the corresponding fixing portion(s) 1011 through at least one first slot 1202, so as to be engaged with the positioning portion 101. Also, the second engaging portion 130 can be engaged with the corresponding fixing slot(s) 1010 in a snap-fit manner through at least one second protruding portion 1301, and be engaged with the corresponding fixing portion(s) 1011 in a snap-fit manner through at least one second slot 1302, so as to be engaged with the positioning portion 101.

In addition, the eyeglass structure 1 of the present disclosure can further have a design in which each of the fixing portion(s) 1011, the first protruding portion(s) 1201 and the second protruding portion(s) 1301 is in a mushroom shape, and each of the fixing slot(s) 1010, the first slot(s) 1202 and the second slot(s) 1302 are in a droplet shape, so that the first engaging portion 120 and the second engaging portion 130 can be firmly engaged with the positioning portion 101 without falling off therefrom easily.

In certain embodiments, the positioning portion 101 is made of elastic material. Therefore, even after a user removes the first engaging portion 120 or the second engaging portion 130 from the positioning portion 101, the first protruding portion 1201 and the second protruding portion 1301 retain their original shapes. Also, since the first engaging portion 120 and the second engaging portion 130 are made of elastic material, the fixing portion(s) 1011 retains its original shape. Therefore, a user can again engage the first engaging portion 120 or the second engaging portion 130 with the positioning portion 101 in the future.

It is further noted that the eyeglasses structure 1 of the present disclosure is not limited by the above-referenced examples.

One of the beneficial effects of the present disclosure is that, through the technical features of "the first elastic contacting member 12 includes a first engaging portion 120 detachably fitted to and engaged with the positioning portion 101, a first linking rod portion 121 connected to the first engaging portion 120, and a first pad portion 122 connected to the first linking rod portion 121," "the second elastic contacting member 13 includes a second engaging portion 130 detachably fitted to and engaged with the positioning portion 101, a second linking rod portion 131 connected to the second engaging portion 130, and a second pad portion 132 connected to the second linking rod portion 131," "the radial cross-sectional area of the first linking rod portion 121 is smaller than the radial cross-sectional area of the first pad portion 122, so as to increase the swing angle of the first pad portion 122 relative to the first engaging portion 120," and "the radial cross-sectional area of the second linking rod portion 131 is smaller than the radial cross-sectional area of the second pad portion 132, so as to increase the swing angle of the second pad portion 132 relative to the second engaging portion 130," the present disclosure enables the first pad portion 122 and the second pad portion 132 to automatically perform angle adjustment according to a wearer's nose bridge curve in a rotating movement similar to that of a universal bearing, so as to achieve a good contacting relation between the nose bridge and the first pad portion 122 and the second pad portion 132, reduce the pressure exerted on the nose bridge, resolve the adjustment problem arisen from the high deformability of a conventional eyeglasses nose bridge pad, and significantly increase the comfort and stability when the eyeglasses are worn on a user's nose.

Further, through the elastic property of the first elastic contacting member 12 and the second elastic contacting member 13, the first pad portion 122 and the second pad portion 132 automatically perform angle adjustment according to a wearer's nose bridge curve, leading to a good contacting relation between the nose bridge and the first pad portion 122 and the second pad portion 132. Also, when the first linking rod portion 121 and the second linking rod portion 131 of the eyeglasses structure 1 are pressed by external force or other factors and becoming deformed, resulting in the first pad portion 122 and the second pad portion 132 not suiting the wearer's nose bridge properly, the wearer needs only to remove the eyeglasses structure 1 from his or her nose bridge and then wear it again, as the first pad portion 122 and the second pad portion 132 can again automatically perform angle adjustment according to the wearer's nose bridge curve, leading to a good contacting relation between the nose bridge and the first pad portion 122 and the second pad portion 132.

Further, since the radial cross-sectional area of the first linking rod portion 121 is smaller than the radial cross-sectional area of the first pad portion 122, the swing angle of the first pad portion 122 relative to the first engaging portion 120 is increased. Also, since the radial cross-sectional area of the second linking rod portion 131 is smaller than the radial cross-sectional area of the second pad portion 132, the swing angle of the second pad portion 132 relative to the second engaging portion 130 is increased. Therefore, a bearable deformation degree of each of the first linking rod portion 121 and the second linking rod portion 131 is increased through the afore-referenced design, so that the first linking rod portion 121 and the second linking rod portion 131 are not damaged or broken after a series of bending and deforming. Also, when the eyeglasses structure 1 is hit by an external force, the first linking rod portion 121 and the second linking rod portion 131 can bend or deform with the aid of their high tolerable deformation capacity, instead of directly transmitting the external force borne by such to the wearer's nose bridge, thus avoiding damage to the user's nose bridge.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were selected and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope.

What is claimed is:

1. An eyeglasses structure, comprising:
    a frame body, having an attaching portion and a positioning portion;
    at least one lens, detachably attached to the attaching portion;
    a first elastic contacting member, including:
        a first engaging portion for detachably engaging the positioning portion without using screws to pass through the first engaging portion;
        a first linking rod portion connected to the first engaging portion; and
        a first pad portion connected to the first linking rod portion; and
    a second elastic contacting member, including:
        a second engaging portion for detachably engaging the positioning portion without using screws to pass through the second engaging portion;
        a second linking rod portion connected to the second engaging portion; and
        a second pad portion connected to the second linking rod portion,
    wherein a radial cross-sectional area of the first linking rod portion is smaller than a radial cross-sectional area of the first pad portion, so as to increase a swing angle of the first pad portion relative to the first engaging portion;
    wherein a radial cross-sectional area of the second linking rod portion is smaller than a radial cross-sectional area of the second pad portion, so as to increase a swing angle of the second pad portion relative to the second engaging portion;
    wherein the first pad portion is swingable relative to the first engaging portion such that the first pad portion is separatably contacted to the first engaging portion, and the second pad portion is swingable relative to the second engaging portion such that the second pad portion is separatably contacted to the second engaging portion.

2. The eyeglasses structure according to claim 1, wherein the first elastic contacting member is separated from the second elastic contacting member, and each of the first elastic contacting member and the second elastic contacting member is a single and independent member the same as or different from the other one.

3. The eyeglasses structure according to claim 1, wherein the first engaging portion and the second engaging portion are connected to each other to form a single member.

4. The eyeglasses structure according to claim 1, wherein the first engaging portion has a first through hole, the second engaging portion has a second through hole, the positioning portion includes a plurality of fixing pillars, the first engaging portion is configured to detachably engage one of the fixing pillars through the first through hole, and the second engaging portion is configured to detachably engage another one of the fixing pillars through the second through hole; and
wherein one side of the first pad portion has at least one protrusion portion, another side of the first pad portion has at least one recession portion, one side of the second pad portion has at least one protruding portion, and another side of the second pad portion has at least one recession portion.

5. The eyeglasses structure according to claim 1, wherein the positioning portion includes a plurality of fixing slots, the first engaging portion has at least one first protruding portion, the first engaging portion is configured to detachably engage a corresponding one of the fixing slots through the at least one first protruding portion, the second engaging portion has at least one second protruding portion, and the second engaging portion is configured to detachably engage a corresponding one of the fixing slots through the at least one second protruding portion; and
wherein each of the fixing slots is in a shape of droplet, and each of the at least one first protruding portion and the at least one second protruding portion is in a shape of mushroom.

6. The eyeglasses structure according to claim 1, wherein the positioning portion includes a plurality of fixing portions, the first engaging portion has at least one first slot, the first engaging portion is configured to detachably engage a corresponding one of the fixing portions through the at least one first slot, the second engaging portion has at least one second slot, and the second engaging portion is configured to detachably engage a corresponding one of the fixing portions through the at least one second slot; and
wherein each of the fixing portions is in a shape of mushroom, and each of the at least one first slot and the at least one second slot is in a shape of droplet.

7. The eyeglasses structure according to claim 1, wherein the positioning portion includes a plurality of fixing portions and a plurality of fixing slots, the first engaging portion has at least one first slot and at least one first protruding portion, the first engaging portion is configured to detachably engage a corresponding one of the fixing portions through the at least one first slot, and detachably engage a corresponding one of the fixing slots through the at least one first protruding portion.

8. The eyeglasses structure according to claim 7, wherein the second engaging portion has at least one second slot and at least one second protruding portion, the second engaging portion is configured to detachably engage a corresponding one of the fixing portions through the at least one second slot, and detachably engage a corresponding one of the fixing slots through the at least one second protruding portion; and
wherein each of the fixing portions, the at least one first protruding portion and the at least one second protruding portion is in a shape of a mushroom, and each of the fixing slots, the at least one first slot and the at least one second slot is in a shape of a droplet.

9. The eyeglasses structure according to claim 1, wherein the first connecting rod portion is configured to allow the first pad portion to swing in a first predetermined range through the elasticity of the first connecting rod portion, and the second connecting rod portion is configured to allow the second pad portion to swing in a second predetermined range through the elasticity of the second connecting rod portion.

10. The eyeglasses structure according to claim 9, wherein each of the first predetermined range and the second predetermined range covers a space in a shape of half a sphere or three fourths of a sphere.

11. An eyeglasses structure, comprising:
a frame body, having an attaching portion and a positioning portion;
at least one lens, detachably attached to the attaching portion;
a first elastic contacting member, including:
a first engaging portion for detachably engaging the positioning portion without using screws;
a first linking rod portion connected to the first engaging portion; and
a first pad portion connected to the first linking rod portion; and
a second elastic contacting member, including:
a second engaging portion for detachably engaging the positioning portion without using screws;
a second linking rod portion connected to the second engaging portion; and
a second pad portion connected to the second linking rod portion,
wherein a radial cross-sectional area of the first linking rod portion is smaller than a radial cross-sectional area of the first pad portion, so as to increase a swing angle of the first pad portion relative to the first engaging portion;
wherein a radial cross-sectional area of the second linking rod portion is smaller than a radial cross-sectional area of the second pad portion, so as to increase a swing angle of the second pad portion relative to the second engaging portion.

12. An eyeglasses structure, comprising:
a frame body, having an attaching portion and a positioning portion;
at least one lens, detachably attached to the attaching portion;
a first elastic contacting member, including:
a first engaging portion for detachably engaging the positioning portion;
a first linking rod portion connected to the first engaging portion; and
a first pad portion connected to the first linking rod portion; and
a second elastic contacting member, including:
a second engaging portion for detachably engaging the positioning portion;
a second linking rod portion connected to the second engaging portion; and
a second pad portion connected to the second linking rod portion,
wherein a radial cross-sectional area of the first linking rod portion is smaller than a radial cross-sectional area of the first pad portion, so as to increase a swing angle of the first pad portion relative to the first engaging portion;
wherein a radial cross-sectional area of the second linking rod portion is smaller than a radial cross-sectional area of the second pad portion, so as to increase a swing angle of the second pad portion relative to the second engaging portion;

wherein the first pad portion is swingable relative to the first engaging portion such that the first pad portion is separatably contacted to the first engaging portion, and the second pad portion is swingable relative to the second engaging portion such that the second pad portion is separatably contacted to the second engaging portion.

* * * * *